(12) United States Patent
Subramoniam et al.

(10) Patent No.: US 11,833,986 B2
(45) Date of Patent: Dec. 5, 2023

(54) VEHICLE WITH AN ELECTRIC PRIME MOVER

(71) Applicant: TVS MOTOR COMPANY LIMITED, Chennai (IN)

(72) Inventors: Chidambaram Subramoniam, Chennai (IN); Yogesh Devidas Patil, Chennai (IN); Dipanjan Mazumdar, Chennai (IN); Soumya Saxena, Chennai (IN)

(73) Assignee: TVS MOTOR COMPANY LIMITED, Chennai (IN)

( * ) Notice: Subject to any disclaimer, the term of this patent is extended or adjusted under 35 U.S.C. 154(b) by 250 days.

(21) Appl. No.: 17/593,707

(22) PCT Filed: Mar. 16, 2020

(86) PCT No.: PCT/IN2020/050239
§ 371 (c)(1),
(2) Date: Sep. 23, 2021

(87) PCT Pub. No.: WO2020/194329
PCT Pub. Date: Oct. 1, 2020

(65) Prior Publication Data
US 2022/0169192 A1 Jun. 2, 2022

(30) Foreign Application Priority Data
Mar. 24, 2019 (IN) .............................. 201941011379

(51) Int. Cl.
*B60R 16/03* (2006.01)
*B60R 16/02* (2006.01)
(Continued)

(52) U.S. Cl.
CPC .......... *B60R 16/03* (2013.01); *B60R 16/0215* (2013.01); *B62J 11/19* (2020.02);
(Continued)

(58) Field of Classification Search
CPC ..... B60R 16/03; B60R 16/0215; B60R 16/02; B62J 11/19; B62K 25/28; B62K 11/10;
(Continued)

(56) References Cited

PUBLICATIONS

International Search Report issued in corresponding International Application No. PCT/IN2020/050239 dated Sep. 24, 2020 (2 pages).
(Continued)

*Primary Examiner* — Robert L Deberadinis
(74) *Attorney, Agent, or Firm* — Osha Bergman Watanabe & Burton LLP

(57) ABSTRACT

A vehicle includes: an electric prime mover; a frame member acting as a load bearing member of the vehicle; and a structural member functionally connected to the frame member. The structural member is capable of supporting the electric prime mover rotatably. The electric prime mover includes a shaft fixedly mounted to the structural member and that is disposed substantially in a lateral direction of the vehicle. The shaft fixedly supports a stationary member of the electric prime mover and the shaft rotatably supports a rotating member of the electric prime mover. A cable assembly extends outward from the stationary member through a cable path defined by the shaft. The cable path includes a portion provided with a caulking member capable of securely holding the cable assembly thereat. The cable assembly includes an external sheath forming at least an outer periphery of the cable assembly.

11 Claims, 5 Drawing Sheets

(51) Int. Cl.
*B62K 25/28* (2006.01)
*B62J 11/19* (2020.01)
*B62K 11/10* (2006.01)
*B62M 7/02* (2006.01)

(52) U.S. Cl.
CPC ............ *B62K 11/10* (2013.01); *B62K 25/283* (2013.01); *B62M 7/02* (2013.01); *B62K 2202/00* (2013.01); *B62K 2204/00* (2013.01)

(58) Field of Classification Search
CPC .............. B62K 25/283; B62K 2202/00; B62K 2204/00; B62M 7/12
See application file for complete search history.

(56) References Cited

PUBLICATIONS

Written Opinion issued in corresponding International Application No. PCT/IN2020/050239 dated Sep. 24, 2020 (5 pages).

VEHICLE WITH AN ELECTRIC PRIME MOVER

TECHNICAL FIELD

The present subject matter relates generally to an electrical machine for a motor vehicle and more particularly the present subject matter relates to a wire sealing for the electrical machine.

BACKGROUND

Generally, commuting is an essential activity every day for majority of the people. Typically, there are various types of vehicles that are used for community depending on the application and the capacity thereof. Of these, a particular category of vehicles have acquired prominence due to their ease of operation and compact layout. Saddle ride-type vehicles are one such category of motor vehicles that are having at least two-wheels and permit the user to have a saddle-ride type posture when being operated. These vehicles are having a compact layout and are adapted to accommodate at least one user.

Generally, these vehicles include at least one prime mover that is either an electrical machine/electric motor or an internal combustion (IC) engine. Some vehicles incorporate both the electric motor and the internal combustion engine that are referred to as hybrid vehicles. Vehicles incorporating electric motor as one of the prime movers are gaining popularity because of their ease of operation, low cost of operation, and reduced emissions. Therefore, the vehicles incorporating the electric motor that are either purely electrical vehicles or the hybrid vehicles are having the prime mover that is either fixedly mounted to a frame member or is swingably connected to the structural member of the frame member. The electric motor is driven by primary power source that provides electrical energy that is converted to mechanical energy by excitation of electrical coils provided in the electric motor. An electrical connection is provided between the electric motor and the primary power source in a controlled mechanism. These electrical connections are high current carrying cables that are provided to be connected to the electric motors. So, these electrical connections are to be securely located in order to deliver reliable operation of the electrical and hybrid vehicles. Also, the electrical components in the electric motor are secured from any external parameters.

BRIEF DESCRIPTION OF THE DRAWINGS

The detailed description of the present subject matter is described with reference to the accompanying figures. Same numbers are used throughout the drawings to reference like features and components.

DETAILED DESCRIPTION

Figure 1:
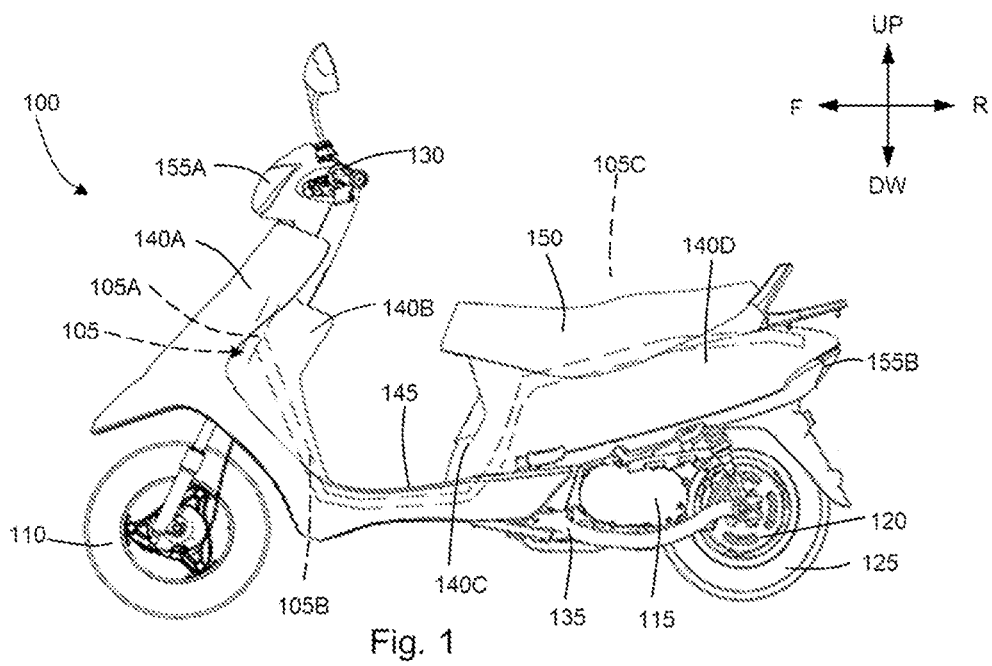
FIG. 1 illustrates a left side view of an exemplary vehicle, in accordance with an embodiment of the present subject matter.

Generally, the vehicles with the electric prime mover being mounted to the structural member have the frame member either swingably or rigidly support the structural member. The primary power unit (e.g. battery) or the control unit is preferably mounted on to the frame member that is a rigid structure. The electrical connections are routed to the electric motor acting as an electric prime mover from the primary power unit or the control unit. Therefore, the electrical cables are to be routed about the frame member and then to the electric motor. Generally, the electrical cables have to be routed till the stator of the electric motor that incorporates the windings. Typically, sheathed cables are used to supply/receive power from the battery to the electric motor and to receive signals from the sensors mounted on the stator of the electric motor. These sheathed cables accommodate multiple cables that include power cables and signal cables. Usually, the power and signal cables are all individually insulated. Further, an additional insulator, which is the external sheath, is used to hold the aforementioned power cables and signal cables which in effect increase an overall diameter of sheathed cable. Generally, the shaft diameter has to be retained within a defined range, especially in case of compact two-wheeled or three-wheeled vehicles. So, for the shaft to accommodate the aforementioned sheathed cable, a path would be required in the shaft with higher diameter. As a result, either diameter of the shaft has to be increased to accommodate the aforementioned cable, but the increased diameter of the shaft not desired as it would add weight and also make the electric machine bulkier. This adversely effects the packaging space for the wheel, hub mounted parts & has an adverse cascading effect on the size of the wheel assembly as well as the entire vehicle packaging & layout. Further in case of a shaft with a smaller diameter, accommodation of such a cable would result in decreased thickness of solid material in the shaft and the strength of the shaft is reduced, which is also not desired. Thus, provision of a compact diameter shaft strength is one of the challenges of the available art.

Further, the shaft has an exit passage which is typically outward from the electric prime mover. For example, the exit passage is provided at the axial end of the shaft or it is outward and adjacent to the wheel. This could result in entry of water into the electric prime mover through the exit passage. The entry of water into the electric prime mover would result in short circuit of the windings which would damage the electric prime mover, stalling the vehicle. Moreover, in some cases the electrical short circuit can damage the electrical circuit connected to the electrical prime mover; also, the electrical prime mover is connected to the control unit and to the power source through the cables which could damage one or more of them and also lead to a potential fire hazard. Especially, during rain or flood there is possibility that the shaft is at least partially submerged in the water this could result in entry of water making the vehicle vulnerable to failure. Thus, there is need for securing the internal components of the machine in a safe & reliable manner within a compact space overcoming all problems in known art.

Additionally, the electric prime mover is supported by a swing arm or the front suspension, which are either moving or swinging. Because of this moving or swinging motion the cable(s) connected to the electric machine is also subjected to movement thereby creating space/clearance resulting in water or dust entry. Also, the cables are routed through the shaft of the electric motor that is mounted to the structural member. This necessitates the electrical cable to undergo various bends and turns to be routed to the electric motor. The cable is prone to wear out due to the swinging or the motion of the cable is rubbing against the edges of the shaft thereby wearing out the outer insulation of the cable. Also, the cable is prone to damage from stone hitting due to bad road conditions or can get rubbed with elevated structures like footpath when vehicle comes near it. Such damage could cause the electrical cable to result in electrical short circuit that could damage the electric motor, the primary power unit/source, or the control unit. Moreover, in some vehicles with the electric motor being mounted to the hub of the wheel and the structural member is swingably connected to the frame member or is pivotably connected to the frame member. Swinging type structural member results in relative motion between the cable that is passing by the swinging structure and rigid/movable parts. This may result in movement of the cable affecting the retention of the cable. Also, the cable may create additional tension at the connection regions. Additionally, the tension created may also affect the desired clearances and may also get pulled off due to jerks. Furthermore, due to the vibration occurring due to operation of the vehicle or due to the vibrations because of presence of internal combustion engine, the cable is subject to tension because of which the electrical contacts to the windings or to the sensors may come off. This could result in stalling of the electric prime mover.

During assembly of the electric prime mover onto the vehicle, the electric prime mover may undergo undesired movement of the cable because of the need for the movement of materials for one point to another point in the assembly area. The electric prime mover even with the cable pre-assembled may undergo certain orientation changes during this material movement. The undesired movement may include a twisting action on the electrical cable during assembly or otherwise.

Typically, grommet/plug or a sealing block may be used at the end portion of the shaft for supporting the cables for sealing the cables, as the grommet can be accommodated in the axial end which has a circular cross-section. However, the use of grommet about a radial surface of the shaft is challenging due to the curved surface of the shaft and also due to the non-circular cross-section of the exit passage, when the exit passage is on the radial surface of the shaft. Moreover, as the electric prime movers operate at high temperature, the grommets are prone to deform whereby sealing function is deteriorated, especially it is challenging in case of the shafts with curved profile. Also, the cables that are having copper conductors are prone to heating due to passing high current therethrough, which results in further heating of the cable that gets transferred to the grommet. Also, the cables with high current carrying capability have higher thickness/diameter making them heavier and such cables when are passing through the grommet, may be resting on the grommets, which with time, deform the grommet due to elastic nature. The grommet may fail exposing the electric prime mover to foreign parameters like water.

Even though, using of grommet or a sealing block with varying cross-section is proposed in the art to provide effective seal. Such a profile of the grommet creates stress points at certain locations on the cable that could damage the seal of the individual cable passing through the grommet. Also, conventionally, plugs may be used instead of grommets, but the plugs face the aforementioned problems similar to the grommets and also with time the plugs provided at the end may deform due to the movement of the cable assembly therethrough as the cables have uniform cross-section and can slide. This may result in unwanted tension in the cables or in lessening of the cables. It also reduces functional effectiveness of the plug. Also, use of tapes is known in the art that is disposed about the plug/grommet to improve sealing. This increases the number of parts that is to be used for sealing and also the aforementioned problem of higher area/diameters of the shaft is required for accommodation in the shaft.

Moreover, conventionally use of a sealing material is known to provide sealing along with the plugs or the like. However, such a system also requires larger diameter and also the plug or the like subject to the aforementioned problems. Besides, the conventionally known sealing is effective in case of the cable passing in a straight line through the hole. But, when there is need for change in orientation of the cable in a direction other than the axial direction of the passage or the shaft, such a bending affects the cable strength. The aforementioned short comings make the conventional known electric motors or machines ineffective.

Thus, there is a need for a vehicle comprising an electrical prime mover that is provided with a cable, which is securely and reliably disposed.

Hence, the present subject matter addresses the aforementioned and other short comings in the prior art. As there is a need for a vehicle with an electric prime mover that is reliable to operate with sealing of electrical/electronic components therein from outside environment.

The present subject matter provides a vehicle comprising at least one electric prime mover. It is a feature that the vehicle is preferably a saddle-ride type vehicle that includes at least two wheels. The electric prime mover is swingably connected to a frame member of the vehicle. The vehicle may include an IC engine that operates as another prime mover and the user can operate any one of the prime movers or both the prime movers as desired. The electric prime mover of the present subject matter provides reliable operation.

It is an aspect of the present subject matter that the structural member can be a swingarm or a crankcase that support at least one wheel of the vehicle. The electric prime mover is an electric motor that is brush less direct current (BLDC) type or an induction type and the electric motor is functionally connected to a high capacity battery/battery pack(s) through a master control unit. Preferably, the electric prime mover is disposed below a seat assembly of the vehicle thereby providing a compact saddle ride-type vehicle layout.

It is a feature that the structural member may include one or more arms that extends substantially in a longitudinal direction of the vehicle. The electric prime mover is mounted to the one or more arms acting as axle support thereof, wherein in the structural member with two arms the electric motor is either mounted to the arms or between the arms. The electric prime mover is preferably hub mounted to a wheel and is disposed away from a pivot portion of the structural member. Therefore, it is an advantage that the vehicle utility space that includes the step-through space or the utility box space is retained.

It is a feature that the electric prime mover includes a stationary member and a rotating member that are supported by a shaft that acts as axle for the electric prime mover and also the wheel. The shaft is disposed substantially in width direction of the vehicle and is supported by the structural member. The stationary member is fixedly mounted to the shaft and the rotating member is rotatable about the shaft. In one embodiment, the rotating member is connected to a rim portion of the wheel. Therefore, the current electric prime mover provides the benefit of direct torque transfer. The shaft of the present subject matter offers required structural strength without increasing the weight by optimally accommodating and sealing cables passing therethrough.

The stationary member includes plurality of teeth provided with windings/coils. The rotating member rotates about the stationary member with an inner peripheral surface of the rotating member facing the teeth. The inner peripheral surface is provided with magnets affixed thereat. Further, a cable assembly functionally connected to the windings provides required current/voltage for operation thereof.

It is an aspect of the present subject matter that the cable assembly includes plurality of signal cables and plurality of power cables that are routed through the shaft. The cables are each functionally connected to respective elements viz. phase windings or sensors etc. The cable assembly is provided with an external sheath that extends along at least a length thereof. A caulking member is provided substantially along the cable path and the caulking member is capable of securing the cables to the shaft at the cable path. The caulking member is capable of sealing any gaps between the cables and also any gaps between the cables and the cable path. It is an aspect that the caulking member provides a tight seal from water or moist entry into the prime mover. Also, the caulking member retains the desired orientation of the cables within the shaft.

It is a feature that the shaft includes the cable path that extends from a substantial shaft center towards one end portion thereof. In one implementation, the cable path extends towards one lateral side and the second passage, which is exit passage of the cable assembly, is provided at angle with respect to the axle axis.

It is another aspect that the external sheath disposed along at least a length of the cable assembly at least partially enters the cable path, especially at the exit passage. In other words, the external sheath is at least partially disposed about the cable path of the shaft and the external sheath is secured by the caulking member. In one embodiment, the external sheath opening/end portion is also sealed, within the cable path, by the caulking member thereby securing the cable assembly from entry of any foreign elements even into the external sheath securing the cable assembly disposed outside of the shaft.

The caulking member retains the cable assembly in a desired orientation, whereby the cable assembly experiences a smooth curvature from the second passage inward about the cable path, due to which any sharp bending is avoided and also wear due to interference with the surface of the shaft is reduced. As in one implementation, the caulking member is made of a material capable of being introduced at the gaps and which subsequently gets hardened forming a rigid seal. In one embodiment, the caulking member is made of elastic material. It is an aspect that the shaft along with the cable can be moved or transported without the panic of any cables orientation or tension variations.

Further, the shaft is provided with the hollow inner portion that provides structurally rigid member and also avoidance of external sheath inside the cable path requires use of shaft with the hollow portion having smaller diameter. In one implementation, the external sheath extends into the second path and partially into the axial path.

The caulking member is disposed substantially from the shaft center towards one end portion of the shaft. Thus, the entire half portion of the shaft is sealed providing tighter seal from entry of any foreign particles like water, dust or moisture. Also, the external sheath is substantially disposed outward of the shaft. In spite of absence of the external sheath along the cable path, the caulking member provides orientation seal and protection to the signal cables and power cables. In addition, there caulking member does not add any stress at specific points thereby improving life of the cable assembly.

The external sheath extends along the cable assembly from one end thereof till the cable path. An elastic guard member is securely supporting the cable assembly along the length thereof. The elastic guard member is secured to the structural member. A radial clearance is provided between the cable assembly and the elastic guide member wherein the elastic guard member is capable of structurally expanding and compressing for compensating any variations due to motion of structural member. Also, the cable assembly having a change in orientation, at the exit path, is supported by the caulking member thereby protecting the cable assembly at the bends even if the power unit is a swinging type power unit.

The elastic guide member is provided with at least one converging portion having a tapering diameter that abuts the cable assembly thereby holding the cable assembly. Thus, the elastic guard member is retained at desired position with respect to cable assembly protecting the cable assembly from any foreign objects like stones. In one implementation, the converging portion at least partially enters into the second passage whereby the converging portion securely guides the cable assembly into the shaft.

Arrows wherever provided in the drawings at the top right corner of the drawing depicts the direction with respect to the vehicle, wherein arrow F implies forward direction, arrow R indicates rearward direction, arrow RH indicates right side of the vehicle, arrow LH indicates left side of the vehicle, arrow UP indicated upward directions, and arrow DW implies downward direction.

FIG. 1 illustrates a left side view of an exemplary motor vehicle (100), in accordance with an embodiment of the present subject matter. The vehicle (100) illustrated, has a frame member (105), which is acting as a load bearing member. In the present embodiment, the frame member (105) is step-through type that includes a head tube (105A), and a main frame (105B) that extend rearwardly downward from an anterior portion of the head tube (105A) defanging the step-through portion. The sub-frame (105C) may extend inclinedly rearward to a rear portion of the vehicle (100) from said main frame (105B).

The vehicle (100) includes one or more prime movers that are either directly or indirectly supported by the frame member (105). In the present implementation, one of the prime movers is an internal combustion (IC) engine (115) mounted to the frame member (105). In the depicted embodiment, the IC engine (115) is mounted to a structural member (135) that is further pivoted to the frame member (105). In one embodiment, the structural member (135) is a rigid member made of rigid material including metal or reinforced polymer. The vehicle (100) also includes another prime mover, which an electric prime mover (120). In a preferred embodiment, the electric prime mover (120) is hub mounted to one wheel of the vehicle (100). In another embodiment, more than one electric motor is mounted to wheels of the vehicle (100). In the depicted embodiment, the vehicle (100) includes at least two-wheels and the electric prime mover (120) that is hub mounted to the rear wheel (125) of the vehicle (100). A front wheel (110) is rotatably supported by the frame member (105) and is connected to a handle bar assembly (130) that enables maneuvering of the vehicle (100).

Further, the vehicle (100) includes a high capacity on-board battery (not shown) that drives the electric prime mover (120). The high capacity battery may include one or more high capacity battery packs or one or more low capacity cells when connected to provide high capacity. The high capacity battery can be disposed at a front portion, a rear portion, or at the center of the vehicle (100) depending on the application. The high capacity battery is supported by the frame member (105). The vehicle (100) includes plurality of body panels, mounted to the frame member (105) for covering various components of the vehicle (100) including the high capacity battery pack. For example, the high capacity battery pack can be operating in the voltage range of 40-70 volts. In the depicted embodiment, the plurality of panels includes a front panel (140A), a leg shield (140B), an under-seat cover (140C), and a left and a right side panel (140D). A glove box may be mounted to a leg shield (140B).

A floorboard (145) is provided at the step-through portion defined by the main frame (105B). A seat assembly (150) is disposed rearward to the step-through portion and is mounted to the main frame (105B). The seat assembly (150) that is elongated in a longitudinal direction (F-R) of the vehicle (100) enables the user to operate the vehicle (100) in a saddle ride-type posture. One or more suspension(s) connect the wheels (110, 125) to the frame member (105) and enable in providing comfortable ride. The vehicle (100) comprises of plurality of electrical and electronic components including a headlight (155A), a taillight (155B), a starter motor (not shown), a horn etc. Also, the vehicle (100) includes a master control unit (not shown) that takes control of the overall operation of the vehicle (100) including the function of the IC engine (115), the electric prime mover (120), charging of the batteries from a magneto/integrated starter generator (ISG), driving of loads by the magneto/ISG, charging of the high capacity batteries by the electric motor operating in generator mode, and any other operations associated with the operation of the vehicle (100).

FIG. 2(a) depicts a rear perspective view of the prime mover assembly (200), in accordance with the embodiment of FIG. 1. The prime mover assembly (200) is supported by the structural member (135). The prime mover assembly (200) in the present implementation includes a first prime mover and an electric prime mover (120) that are mounted to one or more arm(s) (135A, 135B) (shown in FIG. 2(b)) of the structural member (135). The first prime mover is an internal combustion engine (115) that is forwardly inclined with the cylinder portion (CP) that is forwardly disposed. The orientation of the cylinder portion (CP) defines the axis of the piston. The cylinder portion (CP) is mounted to a crankcase (205) of the first prime mover (115). The terms first prime mover and the IC engine are interchangeably used. The crankcase (205) supports various rotational members including the crankshaft (not shown). The crankcase (205) is fixedly mounted to the structural member (135).

Also, the first prime mover includes a kick start mechanism (225) that is enclosed by a crankcase cover (210). The kick start mechanism (225) includes a kick-start lever that is used to crank the IC engine (115) and kick-start lever is pivoted with axis substantially in the lateral direction (RH-LH) of the vehicle (100) whereby the kick-start lever (225) is routable about a pre-defined angle. As depicted, electric prime mover (120) is functionally connected through a cable assembly (325) that extends from the electric prime mover (120) towards a front portion of the vehicle (100). In one embodiment, the cable assembly (325) is securely disposed adjacent to lateral outer periphery of the structural member (135) and it extends below the crankcase cover (210), when viewed from top. In another embodiment, the cable assembly (325) extends out from the electric prime mover (120) and extends between the inner face (FIN) of the structural member (135) and the outer periphery of the electric prime mover (120).

In the present implementation, the structural member (135) includes a first arm (135A) and a second arm (135B) that are separated in the vehicle width direction (RH-LH) and that are extending substantially in the longitudinal direction (F-R) of the vehicle (100). The structural member (135) includes a pivot portion (SP) that is substantially at a front portion thereof. The pivot portion (SP) is swingably connected to the frame member (105). In one implementation, a toggle link (TL) (shown in FIG. 3) is used to swingably connect the structural member (135) to the frame member (105).

Further, the electric prime mover (120), which is the electric prime mover (120), is disposed at a rear end portion of the structural member (135). In other words, the electric prime mover (120) is disposed at the end portion is opposite to the pivot portion (SP) of the structural member (135). The electric prime mover (120) includes a stationary member (305) (shown in FIG. 3) and a rotating member (310). The electric prime mover (120) includes a shaft (315) that is fixedly mounted to the structural member (135) and that supports the rotating member (310) rotatably. The shaft (315) is disposed substantially in width direction (RH-LH) of the vehicle (100). The rotating member (310) and a substantial portion of the stationary member (305) are disposed between the arms (135A, 135B) of the structural member (135). The stationary member (305) is fixedly mounted to the shaft (315) and the stationary member (305) includes substantially cylindrical portion with plurality of teeth (345) disposed annularly and the plurality of teeth (345) are provided with windings/coils wound thereto. The rotating member (310) is also a cylindrical member with a base portion disposed at an offset from an axial center thereof and the base portion is provided with a bearing that enables rotational motion of the rotating member (310) about the shaft (315). Further, an inner peripheral surface of the cylindrical portion of the rotating member (310) is provided with ferrite members like magnets. Therefore, the windings when excited enables turning of the rotating member (310).

The cable assembly (325) extends from the shaft (315) towards front portion of the prime mover assembly (200). The cable assembly (325) extends outward from the shaft (315) through an opening of the exit path, which is disposed outwardly of the structural member (135) whereby the cable assembly (325) extends outward of the structural member (135). In the depicted embodiment, the cable assembly (325) extends along at least a length of the second arm (135B) of the structural member (135) and is substantially disposed adjacent to an outer face (FO) of the structural member (135). The outer face (FO) of the structural member (135) is a circumferential portion of the second arm (135B) that is facing laterally outward and away from the electric prime mover (120), hub mounted to the wheel (125).

Further, when viewed from top, the cable assembly (325) is overlapped by the crankcase cover (210) that extends substantially outward in lateral direction (RH/LH) of the vehicle (100). The cable assembly (325) is securely disposed between an L-shaped space formed between an outer lateral side of the structural member (135) and a lower side of the crankcase cover (210). Further, the cable assembly (325) is secured by an elastic guard member (340) made of a rigid material that encloses at least a circumference of the cable assembly (325). Also, the cable assembly (325) substantially extends outward from the shaft (315) and towards a master control unit (not shown), which is disposed at a height with respect to the prime mover assembly (200) and is further connected to the primary power source (not shown). The cable assembly (325) is preferably routed out, ahead of the securing assembly (230) that includes at least one of mounting portions for the shaft (315), a rear suspension (215) etc. This keeps the cable assembly (325) away from interfering with any of the surrounding parts of the securing assembly (230). Also, one or more guide members (not shown) securely support the cable assembly (325). The primary power source can be a Lithium-ion battery, a Lead-acid battery, a fuel cell, or the like.

Furthermore, the cable assembly (325) includes power cables (365) that are used for exciting the windings of the stationary member (305) of the electric prime mover (120). Also, the cable assembly (325) includes one or more signal cables (335) that provide status and operating parameters of the electric prime mover (120). The various parameters include angular position of the rotating member (310), temperature of the electric motor etc. The power cables (365) and the signal cables (335) are individually insulated by an insulating material. Further, the power cables and the signal cables (335) are combinedly insulated at least along partial length by a combined insulator member that is made of electrically non-conducting material. The elastic guard member (340) securely annularly encloses the combined insulator member.

FIG. 2(b) depicts a cross-sectional view of the prime mover assembly (200) taken along axis (A-A'), in accordance with the embodiment as depicted in FIG. 2(a). The FIG. 2(c) depicts only the electric prime mover (120) and other relevant ancillary components. The shaft (315) is substantially having a cylindrical cross-section along at least an axial length thereof. The shaft (315) may have a uniform cross-section or a varying cross-section along the axial length. Further, the shaft 315 acting as axle is provided with threaded portion at the lateral end portion(s) for fastening the shaft 315 to the structural member 135 through fasteners like bolts. The shaft (315) includes a cable path 316 that extends from a substantial shaft center (SC) towards one end portion thereof. In the present implementation, the cable path (316) extends towards the left side (LH) with respect to the prime mover assembly (200). As depicted in the enlarged portion of FIG. 2(b), the cable path (316) includes a first passage (316A), an axial path (316B), and a second passage (316C). Preferably, the first passage (316A) and the second passage (316C) are disposed at an angle (θ) with respect to the axial path (316B), which is substantially along the shaft axis (S-S'), of the shaft (315). As depicted, the second passage (316B) has an imaginary axis line (EP) and the imaginary axis line (EP) is disposed at angle with respect to the shaft axis (S-S'). The cable path (316) being provided substantially within the shaft (315) eliminates additional routing portion. Further, the shaft (315) provided with the hollow portion formed by the cable path (316) improves the structural strength thereof.

The caulking member (375) is disposed substantially along the axial path (316B), which is substantially securing the cable assembly (325). Further, the external sheath (370) starts from the cable path (316) forms a smooth curve towards the second passage (316C) offering smooth curvature for the cable assembly (325) passing therethrough. Further, the converging portion (340A) of the elastic guard member (340) at least partially enters the cable path 316 annularly surrounding the external sheath (370) protecting the external sheath (370) from the external parameters and also from heat of the shaft (315).

Further, the first passage (316A) is disposed substantially in proximity to the axial center of the shaft (SC), which is referred to as shaft center (SC), and the second passage (316C) is disposed away from the shaft center (SC) at substantially at one end portion. The axial path (316B), the first passage (316A), and the second passage (316C) are forming a continuous path for routing the cable assembly (325) from the inward portion of the stationary member (305) outward of the shaft (315). This forms the cable path (316) being disposed in at least one of a S-shaped profile or C-shaped profile, wherein the first passage (316A) and the second passage (316C) are disposed at an angle (θ) preferably in the range of 10-45 degrees providing smooth radius of curvature and minimizes assembly stress on the cable assembly (325) as well as enabling ease of assembly. In the depicted implementation, the first passage (316A) is extending in a first direction that is rearward. The second passage (316C) is extending in a second direction that is in forward direction. The transition from the axial path (316B) towards either of the first passage (316A) or the second passage (316B) is provided with a curved transition to reduce wear out & enhance reliability.

The cable assembly (325) includes plurality of signal cables (335) and plurality of power cables (365), wherein each individual cable of the plurality of signal cables (335) and the plurality of the power cables (365) are insulated. The signal cables (335) and the power cables (365) are each functionally connected to respective elements viz. phase windings or sensors etc. Further, the cable assembly (325) is provided with an external sheath (370), wherein the external sheath (370) extends along at least a length of said cable assembly (325). The cables (335, 365) are disposed about the cable path (316) and a caulking member (375) is provided substantially along the cable path (316) and the caulking member (375) is capable of sealing any gaps between the cables (335, 365) and between the cables (335, 365) and the inner periphery of the shaft (315), which is the cable path (316). The caulking member (375) provides a tight seal from water or moisture entry into the electric prime mover (120). In the present embodiment, the caulking member (375) is a sealing material. The sealing material may include one or more materials involving at least one step for introducing and processing the material, whereby the sealing material settles thereat and gets hardened forming the caulking member (375).

Further, in an embodiment, as depicted, the external sheath (370) that is disposed along at least a length of the cable assembly (325) at least partially disposed within the cable path (316). In other words, the external sheath (370) at least partially extends into the cable path (316) and the external sheath (370) with the opening is also sealed within the cable path (316) by the caulking member 375 thereby securing the cable assembly (325) from entry of any foreign elements. The caulking member (375) enables the cable assembly (325) to have a smooth curvature at the second passage (316C) thereby eliminating or at least reducing any cable wear.

The external sheath (370) extends along the cable assembly (325) from one end thereof till the cable path (316), at least partially entering the cable path (316). The elastic guard member (340) is securely supporting the cable assembly (325) along the length thereof. The elastic guard member (340) in one implementation is a spiral member made of a rigid material that is capable of accommodating any variations in orientation or the length of the cable assembly (325). The elastic guard member (340) provides a clearance with the external sheath (370) whereby the cable assembly (325) is slidable therein.

Further, at end portions of the elastic guard member (340) is provided with at least one converging portion (340A) that is having a tapering diameter. The elastic guard member (340) is provided with tapering diameter in proximity to the cable path (316), wherein the elastic guard member (340) in proximity to the cable path (316) is abutting the external sheath (370) of the cable assembly (325) whereby the elastic guard member (340) can be retained at desired location. Also, the elastic guard member (340), in one implementation, at least partially enters the second passage (316C) of the cable path (316). This keeps the cable assembly (325) from the edges of the shaft (315). Further, the converging portion (340A) abuts the cable assembly (325) and at least partially enters into the second passage (316C) whereby the converging portion (340A) rigidly holds the cable assembly (325). This protects the cable assembly (325) at the bend portions as the elastic guard member (340) is capable of adapting to the profile thereof. Further, the converging portion (340A) is stretched and routed inside the exit passage (316C), and is retained in place using the caulking (375) to further restrict the movement of the elastic guard member (340). This also has the benefit of maximizing the curvature or bend of the cable assembly (325) towards the converging portion (340A) as compared to when the cable assembly (325) is routed through inside of the structural member (135). Also, the cable assembly (325) and the external sheath (370) are kept away from any direct contact with the shaft (315) by the caulking member (375) and the elastic guard member (340). This reduces the transfer of heat to the cable assembly (325) thereby protecting the cable assembly (325) and the metal cables therein from working effectively.

Further, a bush member (355) (as shown in FIG. 2(c)) is mounted to the shaft (315), wherein the bush member (355) is provided with a U-shaped cut that abuts against the cable assembly (325) thereby holding the cable assembly (325) closer to the structural member (135) and maintaining bend radius of the cable assembly (325) and providing constant gap between the structural member 135 and the cable assembly (325), post assembly.

Figure 2:
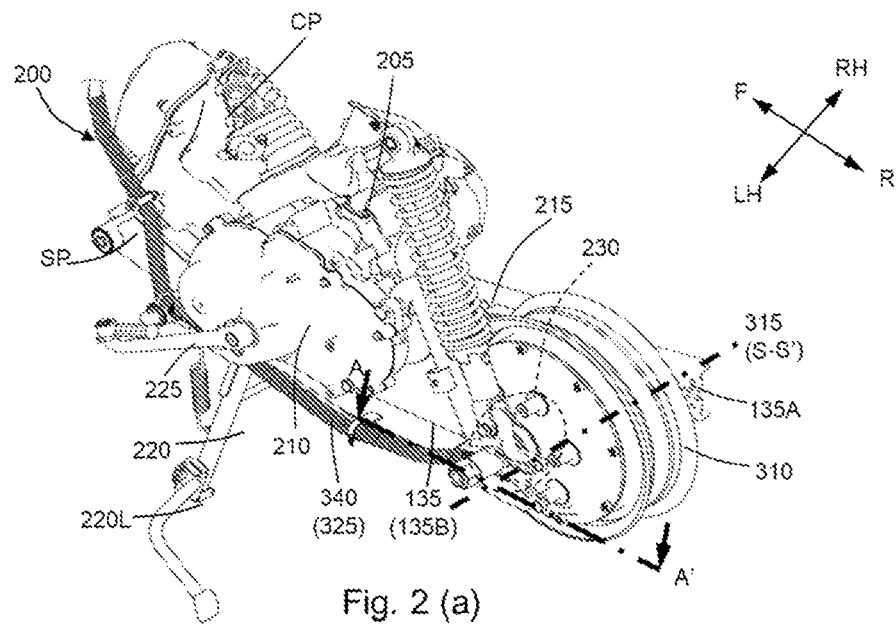
FIG. 2(a) depicts a rear perspective view of the prime mover assembly as shown in FIG. 1, in accordance with an embodiment of the present subject matter.
FIG. 2(b) depicts a cross-sectional view of the prime mover assembly of FIG. 2(a), in accordance with the embodiment of the present subject matter.
FIG. 2(c) depicts a perspective view of a shaft, in accordance with another embodiment of the present subject matter.
FIG. 2(d) depicts a sectional view of the shaft as depicted in FIG. 2(c), in accordance with the embodiment of the present subject matter.
Figure 2:
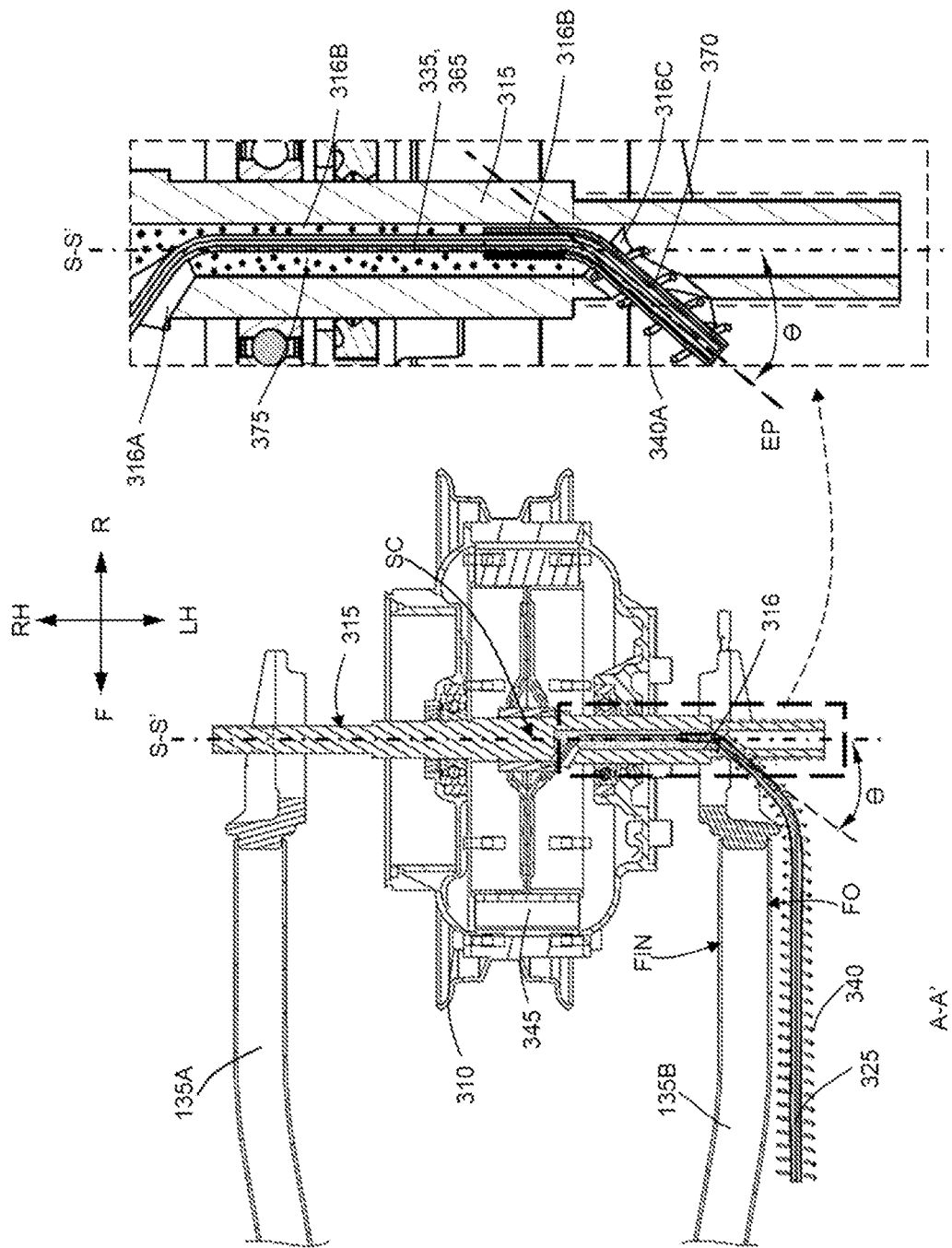
Figure 2:
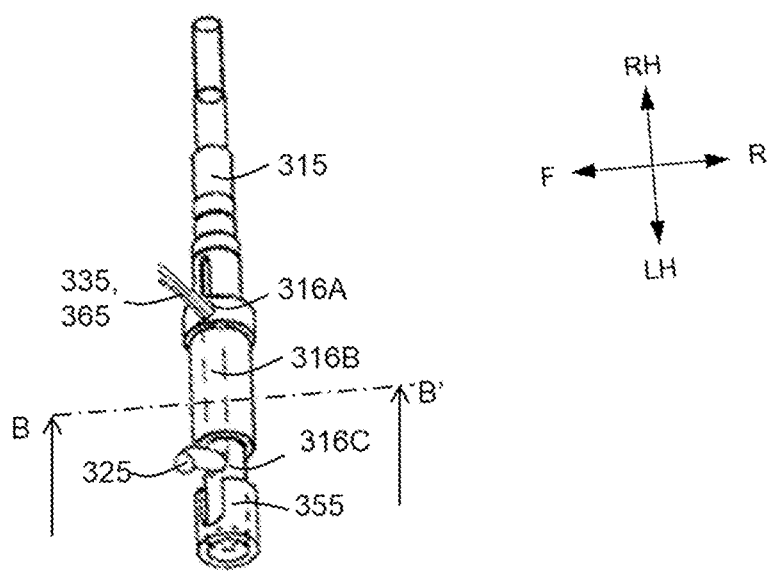
Figure 2:
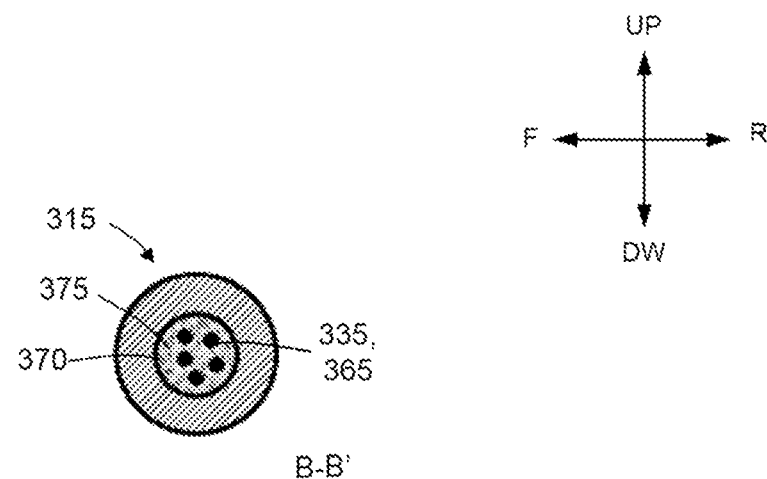

FIG. 2 (c) depicts an isometric view of the shaft (315) and FIG. 2(d) depicts a sectional view of the shaft (315) depicted in FIG. 2(c), the section taken along axis (B-B'). The cable path (316) includes an entry passage (316A) disposed substantially in proximity to a shaft (315) center (SC) of the shaft (315) and the entry passage (316A) is disposable in any orientation, which includes at least a first orientation, to enable the cables (335, 365) to connect with the winding(s) or sensor(s) that are disposed annularly about the stator. The cable assembly (325) extends outward from the shaft (315) through a second passage (316C) that is disposed in any orientation like a forward direction or downward direction or a portion on circumference formed between the forward direction and the downward direction. At the entry passage (316A), the plurality of power cables (365) and the plurality of signal cables (335) are extending outward. Whereas, at the second passage (316C), the cables (335, 365) are secured by the external sheath (370). The shaft (315) at the cable path (316) is provided with the caulking member (375) that securely seals the exit passage (316C), which is the exit passage (316C) of cable assembly (325), from any entry of moist, water or the like. The sectional view B-B' shows the shaft (315) with the cables (335, 365) secured therein by the caulking member (375) and the shaft (315) is having an optimum thickness, between the outer periphery and the inner periphery, that enables the shaft (315) to act as an axle for the vehicle (100). As shown, the caulking member (375) completely seals any gaps between the cables (335, 365) and also between the cable path (316). Further, the cables (335, 365) are retained in the desired orientation within the shaft (315) and also at the entry and the exit paths of the cable path (316).

Figure 3:
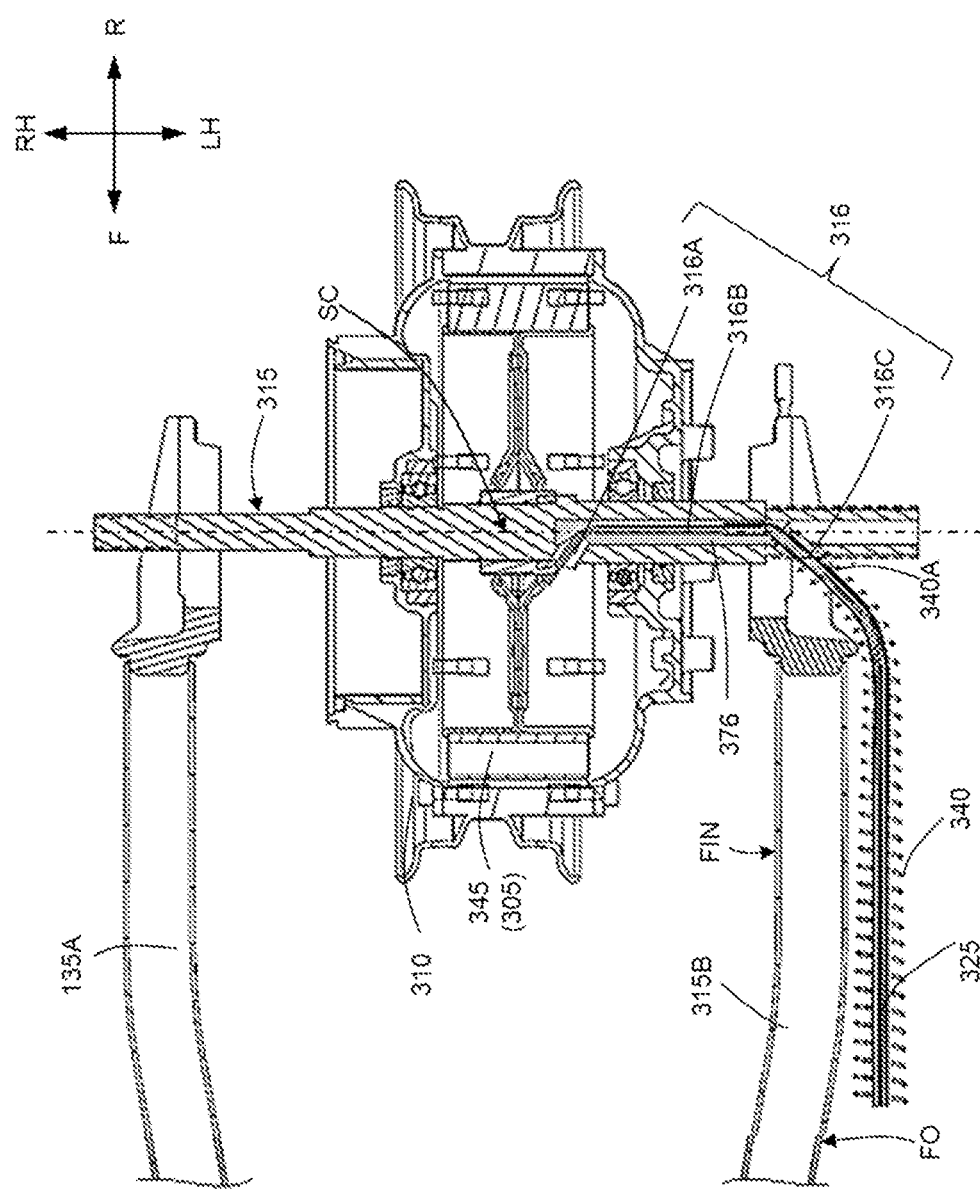
FIG. 3 depicts a sectional view of the prime mover assembly, in accordance with another embodiment of the present subject matter.

FIG. 3 depicts a cross-sectional view of a prime mover assembly (200) with selected parts in accordance with another embodiment of the present subject matter. In the present embodiment, the cables (335, 365) are each functionally connected to respective elements viz. phase windings or sensors etc. The cables (335, 365) are disposed about the cable path (316) and a caulking member (376) is provided substantially along the cable path (316) and the caulking member (375) is capable of sealing any gaps between the cables (335, 365) and between the cables (335, 365) and the inner periphery of the shaft (315), which is the cable path (316). The caulking member (376) in the present embodiment is an elastic member that is capable of accommodating the cables (335, 365) and at the same time is capable of providing a tight seal from water or moist entry into the electric prime mover (120).

In one implementation, the caulking member (376) is an elastic sealing member that is first assembled with the cables (335, 365) and subsequently the cable assembly (325) aligned with the caulking member (376) is assembled into the shaft (315). In one implementation, routing of the cable assembly (325) is performed by pulling the cable assembly (325) using an external wire to avoid the cable assembly (325) getting stuck inside the shaft (315).

Further, in an embodiment, as depicted, the external sheath 370 that is disposed along at least a length of the cable assembly 325 is at least partially disposed within the cable path 316. In other words, the external sheath 370 at least partially extends into the cable path 316 and the external sheath 370 with the opening, towards the cable path 316, is also sealed within the cable path 316 by the caulking member 376 thereby securing the cable assembly 325 from entry of any foreign elements there into as well as eliminating any potential fire hazard. The caulking member 376 enables the cable assembly 325 to have a smooth curvature at the second passage 316C thereby eliminating or at least reducing any cable wear due to any interaction with the edges of the shaft 315. In the depicted embodiment, the cable assembly 325 extends outward from the shaft 315 towards an outer face FO of the structural member 315/315B.

In another embodiment, the cable assembly (325) extends out from the shaft (315) towards a gap formed between the inwards face of the structural member (135) and the outer periphery of the electric prime mover (120).

Figure 4:
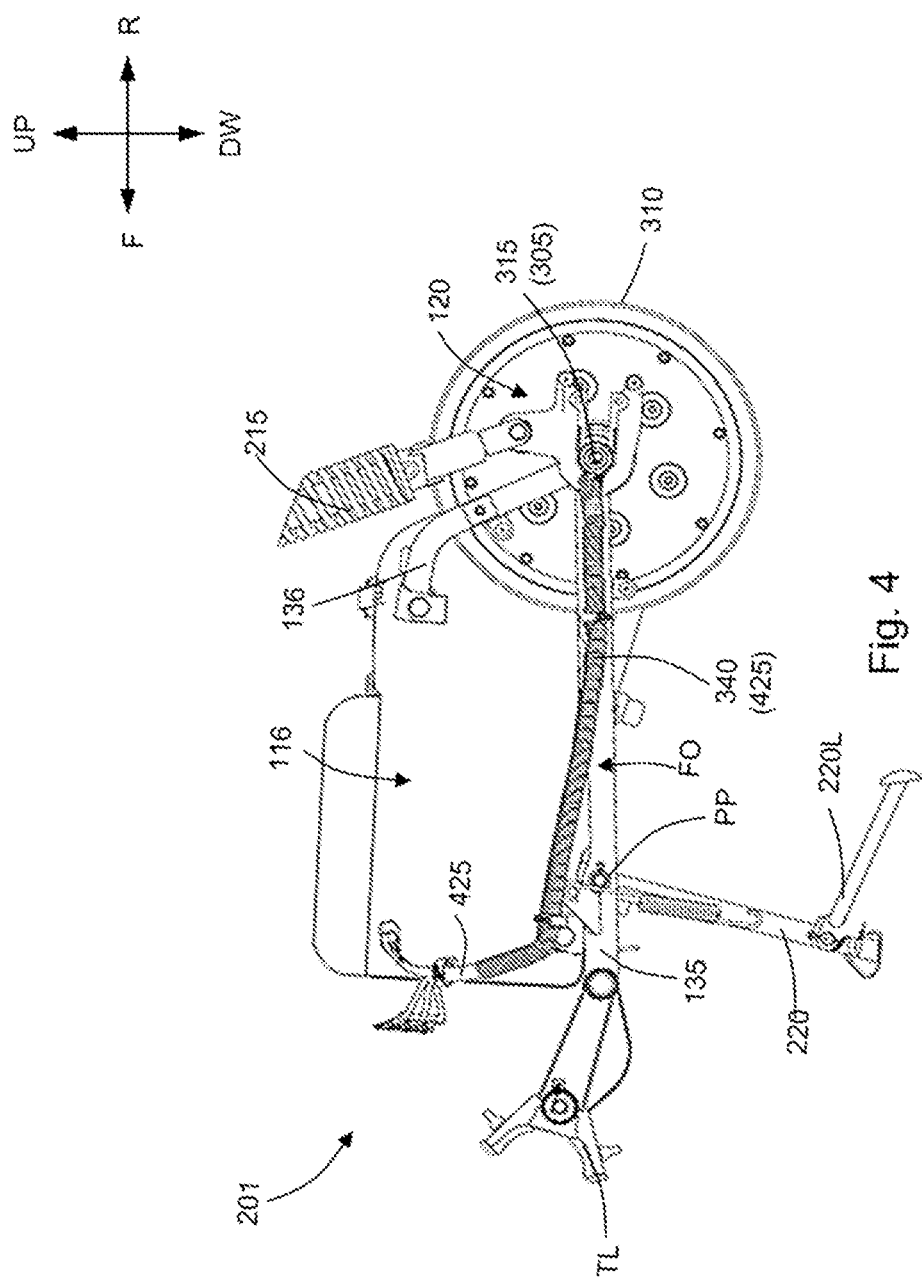
FIG. 4 depicts a side view of another prime mover assembly, in accordance with yet another embodiment of present subject matter.

FIG. 4 depicts a side view of a prime mover assembly (201) for an electric vehicle (100), in accordance with another embodiment of the present subject matter. The prime mover assembly (201) includes only an electric prime mover (120) that is rotatably supported by the structural member (135). A cable assembly (425) extends outward from the shaft (315) through a cable path (316) (similar to as shown in FIG. 2(c)). The cable path (316) includes an exit passage (316C) guiding the cable assembly (425) out of the shaft (315) outwardly of the structural member (135) and adjacent to an outer face (FO) of the structural member (135).

The structural member (135) supports an auxiliary storage unit (116) that is fixedly mounted. The auxiliary storage unit (116) is capable of accommodating one or more auxiliary storage unit(s) (not shown). In one implementation, the auxiliary storage unit (116) is disposed below the seat assembly (150). The master control unit is also disposed below the seat assembly (150) and below a front portion thereof. Further, the auxiliary storage unit (116) is capable of accommodating a master control unit (not shown) therein. The cable assembly (425) extends in the forward direction from the shaft (315) and is disposed adjacent to at least a length of the structural member (135). The structural member (135) includes one or more cross-members (136) disposed at an elevation from the arm members of the structural member (135) for securely supporting the auxiliary storage unit (116) thereat. Then the cable assembly (425) extends upward with a first inclination or a first curvature making an acute angle with a horizontal line/plane. The first inclination is above a pivot portion (PP) of the main stand (220) of the vehicle (100). The main stand (220) includes a lever (220L) which in a disengaged condition of the main stand (220) extends upward and is substantially laterally away from the structural member (135). In other words, the cable assembly (425) is disposed substantially inwards with respect to a space covered by the main stand (220) and the lever (220L) of the main stand (220). Also, the cable assembly (425) is at least annularly enclosed by an elastic guard member (340) disposed along at least a length of said cable assembly (425).

The auxiliary storage unit (116) is capable of accommodating primary power sources including high capacity battery packs. The high capacity battery packs may be of Lithium-ion type, or Lead-acid type, hydrogen fuel cells or the like.

It is to be understood that the aspects of the embodiments are not necessarily limited to the features described herein. Many modifications and variations of the present subject matter are possible in the light of above disclosure. Therefore, within the scope of claims of the present subject matter, the present disclosure may be practiced other than as specifically described.

List of reference signs:

100 vehicle
105 frame member
105A head tube
105B main frame
110 front wheel
115 internal combustion engine
116 auxiliary storage unit
120 electric prime mover
125 rear wheel
130 handle bar assembly
135 structural member
135A first arm
135B second arm
140A front panel -continued List of reference signs:

145 floorboard
150 seat assembly
200/201 prime mover assembly
205 crankcase
210 crankcase cover
220 main stand
220L lever
225 kick start mechanism
S-S' shaft axis
EP imaginary axis line
305 stationary member
315 shaft
316 cable path
316A first path
316B axial path
316C second passage
325/425 cable assembly
335 signal cable
340 elastic guard member
340A converging portion
365 power cables
370 external sheath
355 bush member
F-R longitudinal direction
FO outer face
RH/LH lateral direction
SP pivot portion
PP pivot portion
SC shaft center
LH left side
RH right side
θ angle
375 caulking member
376 caulking member

We claim:

1. A vehicle comprising:
an electric prime mover;
a frame member acting as a load bearing member of said vehicle; and
a structural member functionally connected to said frame member, wherein
said structural member is capable of supporting said electric prime mover rotatably,
said electric prime mover comprises a shaft fixedly mounted to said structural member and that is disposed substantially in a lateral direction of said vehicle,
said shaft fixedly supports a stationary member of said electric prime mover and said shaft rotatably supports a rotating member of said electric prime mover,
a cable assembly extends outward from said stationary member through a cable path defined by said shaft,
said cable path comprises a portion provided with a caulking member capable of securely holding the cable assembly thereat, and
said cable assembly comprises an external sheath forming at least an outer periphery of said cable assembly.

2. The vehicle according to claim 1, wherein
said cable path comprises an exit passage disposed at one end portion of the shaft, and
said exit passage is disposed at angle with respect to a shaft axis of said shaft.

3. The vehicle according to claim 1, wherein said external sheath:
extends along at least a length of said cable assembly,
at least partially enters said cable path through an exit passage, and
is disposed substantially outward of said shaft.

4. The vehicle according to claim 1, wherein said caulking member is formed by introducing a material capable into said cable path and subsequently being hardened.

5. The vehicle according to claim 1, wherein
said caulking member is made of an elastic material and is secured to said cable assembly, and
said cable assembly along with said caulking member is capable of being securely mounted to said shaft.

6. The vehicle according to claim 1, wherein said cable assembly:
extends outward of the shaft and outwardly of the structural member,
is swingably connected to said frame member,
extends substantially along at least a length of said structural member, and
is adjacent to an outer face of said structural member.

7. The vehicle according to claim 1, wherein said cable assembly:
extends outward of the shaft and inwardly of the structural member,
is swingably connected to said frame member,
extends substantially along at least a length of said structural member, and
is adjacent to an inner face of said structural member.

8. The vehicle according to claim 1, wherein
said cable path comprises an entry passage and an exit passage,
said entry passage and said exit passage are connected by an axial path,
said entry passage is disposed substantially at a shaft center of said shaft,
said entry passage is disposable in at least a first orientation to enable connection with one or more winding(s) wound about said stationary member, and
said exit passage is disposed at one end portion of said shaft.

9. The vehicle according to claim 1, wherein said external sheath is secured at the cable path by said caulking member that seals an opening of the external sheath thereat.

10. The vehicle according to claim 1, wherein
said cable assembly is annularly enclosed by an elastic guard member disposed along at least a length of said cable assembly,
said elastic guard member is made of a rigid material and is capable of structurally expanding and compressing for compensating variations due to swinging motion of said structural member swingably connected to said frame member.

11. The vehicle according to claim 10, wherein
said elastic guard member extending along said cable assembly comprises a converging portion disposed in proximity to said shaft, and
at least a portion of said converging portion extends at least partially into an exit passage.

* * * * *